Patented Jan. 26, 1943

2,309,610

UNITED STATES PATENT OFFICE 2,309,610

WATER-SOLUBLE PHENOLIC RESIN AND PROCESS OF MAKING SAME

Harry Burrell, Paramus, N. J., assignor to Ellis-Foster Company, a corporation of New Jersey No Drawing. Application January 13, 1942, Serial No. 426,562

2 Claims. (Cl. 260—25)

This invention relates to phenol-aldehyde condensation products produced under such conditions as to maintain these normally water-insoluble products peptized to a degree whereby the said products are completely (but probably colloidally) soluble in and dilutable with water.

The resins disclosed herein may be classified as rosin-modified phenolic resins, but differ in several important particulars from any such rosin-modified resin mentioned in the prior art. It is well known that phenol-formaldehyde resins may be rendered oil-soluble by fusion with rosin. It is not intended that the method of this invention produces such resins, and indeed, the products of the present invention are in fact insoluble in drying oils. Furthermore, ordinary oil-soluble rosin-modified phenolic resins cannot be rendered water-soluble and still possess desirable properties in the degree or kind possessed by the products of this invention. Rosin-modified phenolic resins of the prior art are well known to be not heat-reactive; this fact, for instance, is evidenced by a typical procedure given in U. S. Patent 1,205,081 for preparing an oil-soluble phenolic resin wherein such a resin was heated for 3 hours at 300° C. and still remained fusible. The products made by the procedure herein disclosed remain heat-reactive (that is, they are converted to an insoluble and infusible form by being subjected to heat) even though the proportion of rosin be great or even predominant.

It is an object of this invention to produce an improved paper size which may simultaneously act as a binding agent.

It is a further object of the invention to provide a resin of phenolic character which is soluble in water and which is capable of very strong dilution with water without precipitating, thus being useful, for instance, as a waterproofing size for cellulosic materials.

Another object is to provide a phenolic resin capable of being combined with cellulosic materials to form products having light transmitting characteristics normally associated only with urea-formaldehyde products.

Still another object is to prepare a cheap heat-reactive phenolic resin suitable for the preparation of molding compositions. By incorporating substantial amounts of rosin, the cost of the resins may be reduced to about one half that of straight phenol-formaldehyde resins.

Phenol itself or its homologs such as the cresols or xylenols or mixtures of phenols may be used in the process of the invention. Formaldehyde is the preferred resinifying body although other aldehydes are not excluded. Rosin or colophony is a suitable and desirable modifying agent. Any of the alkali metal hydroxides or carbonates may be used as solubilizing agents, but sodium carbonate or soda ash is preferred both because of its cheapness and the desirable type of reaction brought about thereby. Ammonia is not suitable as a solubilizing agent.

The general method for preparing the resin solution has simplicity as its virtue. The phenol, formalin, rosin, and soda ash are all mixed together, then boiled under reflux. As the reaction proceeds the ingredients become all mutually soluble and a clear, light brown, rather viscous solution is obtained which may be thinned with water if desired. From a study of the prior art, one would expect that it were necessary to carry out the reaction stepwise; the fact is unexpected that a homogeneous solution of a heat hardening resin is obtained. Several times it has been suggested that phenol be heated with rosin before reacting with an aldehyde; this procedure is definitely detrimental in the present process because any substantial preheating of the phenol and rosin alone results in a solution which is unstable with respect to dilution.

A slight modification of the above one-step reaction may be used if desired in certain cases. The phenol, rosin and formaldehyde may be coreacted in the presence of an acid catalyst, such as, for example, 1% sulfuric or hydrochloric acid based on the weight of phenol used. The resin which precipitates out should be washed and then may be solubilized by heating with sufficient sodium carbonate, conveniently added in small proportions. If desired, the acid-catalyzed resin may be dehydrated after washing and before solubilizing, although this is not necessary. When phenol itself is used, it is not necessary to boil the resin with the sodium carbonate, but simple heating of the undehydrated resin (which ordinarily contains about 30% moisture) and carbonate to about 90° C. suffices to effect solubilization. If higher phenols are used, such as cresol, it is necessary to boil the resin and carbonate together until solution is effected. The solubilized resin may be diluted with water while hot, or it may be allowed to cool when an extremely viscous somewhat rubbery material is obtained which may also be thinned with water. This two-step process is useful in some instances, but in general the one-step procedure is to be recommended.

The well known rules of varying the ratio of formaldehyde to phenol apply to the products of this invention in a manner similar to ordinary phenolic resins. From one to two mols or more of formaldehyde may be used for each mol of phenol, but for reasons of economy I advantageously use about 1.4 to 1.5 mols. The proportion of rosin which may be incorporated I have found to lie between fairly definite limits. If the weight of rosin be less than 35% of the combined weights of phenol plus rosin, the resulting resin solution is not stable but the resin will separate out of solution. It is required therefore that the amount of rosin be substantially equal to or greater than this figure. For a general purpose resin, I prefer to have about equal weights of rosin and phenol present. As far as stability of the resin solution is concerned, there is no upper limit of rosin content, and for certain purposes, for instance where the resin is to be used as a paper size, as much as 90 or 95% of the final resin may be rosin, if desired. However, very high percentages of rosin result in products having a low softening point, high water-sensitivity, and a long cure time. For practical purposes, I prefer to fix the upper limit of rosin content at about 67% of the weight of rosin plus phenol, which is substantially the same as two parts of rosin to one part of phenolaldehyde resin. Such a resin will heat-harden without inordinately long heating periods, and the cured resin is substantially non-sensitive to water, alcohol, benzene, and other organic solvents. The rosin may be augmented or partially replaced by fatty acids in certain instances.

The amount of alkali used is approximately equal to that theoretically required to neutralize the rosin present. A convenient and preferred amount is 16% anhydrous sodium carbonate based on the weight of rosin; this will neutralize about 90% of the rosin, considering rosin for the purposes of calculation to be wholly abietic acid. The corresponding amount of sodium compounds remains in the resin after curing of the same, but does not render soluble a resin containing less than 67% rosin after the insoluble and infusible stage has been reached.

To summarize, the preferred proportions are given in the following table, where parts are by weight.

| | |
|---|---|
| Rosin | 35 to 67 |
| Phenol (or homolog) | 65 to 33 |
| Formalin, 37.5% | 83 to 42 |
| Sodium carbonate, anhydrous | 5.6 to 10.7 |

The time required for the mutual reaction to take place between the constituents depends for one thing on the state of subdivision of the rosin. A fairly finely powdered rosin will dissolve after about 10 minutes refluxing to provide a homogeneous solution, whereas larger lumps of rosin, of course, dissolve more slowly. In case a greater degree of initial polymerization is desired, refluxing may be continued for several hours. After boiling for an hour or two, a separation of a slight water layer may be noticed, but this may be ignored because upon addition of more water and stirring (thinning) the two layers again become one homogeneous solution. If refluxing is continued for 5 or 6 hours or longer, the solution becomes extremely viscous and eventually gels and danger of overheating and charring is incurred. The time of reaction is not critical, and boiling for about 30 minutes is satisfactory.

Curing of the resin occurs at about the same conditions as ordinary unmodified phenolic resins known to the art, depending on the mass and exact composition of resin, temperature, pressure, etc. No exact recommendations can be made, but an idea of the conditions may be had from the examples. The addition of hexamethylenetetramine is not essential in curing the resin.

A special and important use for the aqueous phenolic resin solutions is as a sizing agent in the paper and allied industries. The aqueous solutions may be strongly diluted without precipitating before the desired point, and deposition on the fibers is easily accomplished in the ordinary way by means of alum. When the usual plain rosin size is used in paper making a great excess of alum is required to effect optimum sizing. With the product of the present invention, maximum sizing occurs when very nearly the stoichiometric amount of alum to react with the alkali present is used. This results in a considerable saving of alum and allows a relatively non-corrosive water of higher pH to be maintained in the system. Such a sized paper product is also strengthened by the binding action of the resin as well as made water-resistant. The resin is especially adaptable as a wallboard sizing and binding agent or, in certain cases, it may be advantageous to mix the size of the present invention with ordinary rosin size.

Resins prepared according to the present invention are also useful in a variety of other ways, several of which will be mentioned as illustrations. For instance, molding compositions may be prepared in known manners, and preferably by a "varnish method" wherein the water solution of the resin is mixed with a filler, preferably a cellulosic filler such as, for example, wood flour, and dried. Excellent penetration of the fibers of the filler is obtained by this procedure. Articles formed by hot pressing the molding compositions possess a high degree of translucency, a characteristic notoriously lacking in ordinary phenolic molding compositions. A good degree of flow is also evidenced, especially when the resin contains 55 or 60% rosin. Water resistance is obtained without difficulty. The resin solutions of the invention are useful in the cold-molding field because of the extremely cheap vehicle (water) and cheap resin. The resin solutions are also valuable impregnants for building up laminated products from sheets. Cellulose sheets such as paper may be immersed in a bath of the water-soluble phenolic resin, dried, and a superposed pile of sheets heated under pressure to yield a laminated piece of good color and light transmitting properties. Such translucent sheets have heretofore been usually made utilizing urea resins, but the resin of the present invention allows products to be made from a phenolic resin which are useful as illuminated radio dials, lamp shades, decorative surfaces, and the like. The resin solutions are also useful as coatings, but normally require the addition of a plasticizer such as tricresyl phosphate. Coating compositions may also be made by augmenting or replacing part of the rosin with fatty acids such as stearic, eleostearic, oleic, linseed oil acids, and the like, and these may be co-reacted in the compositions. A small volume of ethyl alcohol is sometimes useful, when added to the aqueous solutions, to decrease viscosity considerably.

In order that the invention may be better understood, the following examples are given to illustrate the method of preparation and use, but the invention should not be construed to be limited as to scope or intent thereby. Parts are by weight.

Example 1

|  | Parts |
|---|---|
| m—p Cresols | 200 |
| Powdered rosin | 200 |
| 37.5% formalin | 225 |
| Anhydrous Na₂CO₃ | 52 |

The sodium carbonate was dissolved in 200 parts warm water, then added to the other three ingredients. The whole mixture was brought to a boil and refluxed 30 minutes. The resulting clear brown solution could be thinned with water to form solutions which remained clear.

Example 2

|  | Parts |
|---|---|
| Phenol, loose crystals | 100 |
| Rosin, powdered | 100 |
| 37.5% formalin | 172 |
| Anhydrous sodium carbonate | 16 |

All the ingredients were mixed together and boiled under reflux for 30 minutes. The product was a clear, light brown, rather viscous syrup, which could be strongly diluted with water without causing precipitation of solids. The yield was 372 parts of solution containing 55.6% solids.

Example 3

|  | Parts |
|---|---|
| Alpha flock | 80 |
| Solution prepared in Example 2 | 130 |

The ingredients were thoroughly mixed in a mechanical device and spread out to dry at room conditions. The dry powder was molded at 350° F., 5000 pounds per square inch, for 5, 10, and 15 minutes. Satisfactory cures were obtained in all these molding times, and even the molding pressed for 5 minutes was not soft or sticky. The moldings were fairly strong, and were exceptionally translucent for phenolic resin, being practically equal in translucency to a urea resin molding from the same die.

Example 4

|  | Parts |
|---|---|
| Powdered rosin | 100 |
| Phenol | 100 |
| 37.5% formalin | 172 |
| Sulfuric acid, sp. gr. 1.86 | 1.9 |

The ingredients were boiled together under reflux for 30 minutes when a good separation of resin from the aqueous layer had occurred. The resin was washed with several changes of hot water; a sample of the resin was dehydrated and found to contain 35% moisture. The remainder of the undehydrated resin was heated to 90° C. with 7.5 parts of anhydrous sodium carbonate per 100 parts of resin, and when evolution of carbon dioxide had ceased, sufficient water was added to form a solution containing 20% solids. The product was a clear brown syrup. This solution showed no signs of separation even after standing for 4 months.

Example 5.—The product of Example 4 was used as a size and binder for a wallboard. A batch of fibrated redwood was rod-milled with sufficient of the 20% solution prepared in Example 4 so as to provide 10% resin based on the dry weight of wood. The resin was precipitated by adding to the rod mill just sufficient 10% aluminum sulfate solution to react with the amount of sodium carbonate present. The stock was formed into a thick cake on a sheet-forming device, partly dehydrated to about 60% water content, then pressed to ¼ inch thickness at 260° F. for 20 minutes. The resulting wallboard was light brown in color and had a glazed surface. It weighed 0.97 pound per square foot, had a modulus of rupture of 2560 pounds per square inch and a water absorption of 2.7%.

Another series of wallboards was made in a similar manner, using the resin prepared in Example 2 in varying proportions. The following table shows the strengths and water-resistances obtained with varied amounts of the resin, the percentages of the latter being expressed on a dry basis in the finished board.

| | Modulus of rupture | Water absorption |
|---|---|---|
| Per cent resin size: | P. s. i. | Per cent |
| 2.5 | 1200 | 5.4 |
| 5 | 1750 | 4.0 |
| 10 | 3800 | 2.7 |

The resin prepared in Example 2 was also used in a wallboard made by the above procedure using fibrated white pine wood. A board containing 10% phenol resin size had a water absorption of 13% whereas a similar board containing 5% ordinary rosin size had a water absorption of 90%. In the case of white pine, the phenolic size had special utility.

Example 6

|  | Parts |
|---|---|
| m—p Cresols | 50 |
| Powdered rosin | 100 |
| 37.5% formalin | 75 |
| Anhydrous Na₂CO₃ | 16 |
| Water | 70 |

The last two ingredients were mixed to form a solution, then added to the first three ingredients. The whole was boiled under reflux for 1 hour. The product was a brown colored, extremely viscous, water-soluble syrup.

Example 7.—The resin solution of Example 1 was suitably thinned with water and used to impregnate 14 sheets of absorbent paper. The sheets were air-dried, then superposed and pressed at 2000 pounds per square inch at 300° F. for 20 minutes. The product was a fairly thick, quite strong sheet of light brown color, and was uniformly translucent. It was substantially unaffected by acetone, alcohol, benzene, or water.

The resin solution of Example 6 was also used in the same way and yielded a very similar product, but the flow of the resin was much greater and consequently a smaller pressure was used in curing the laminated sheet.

Example 8

|  | Parts |
|---|---|
| Phenol | 50 |
| Rosin, powdered | 50 |
| Anhydrous Na₂CO₃ | 8 |
| 37.5% formalin | 64 |

The sodium carbonate was dissolved in 20 parts of water, and added to the other ingredients. The whole was boiled under reflux for several hours. After 3 hours, a slight separation of a water layer occurred which after 5 hours amounted to approximately 10 parts. At this stage the resin was very viscous, and in fact was a soft solid at room temperature. The water-solubility was tested throughout the refluxing, and the resin remained completely water-soluble even after 5 hours.

*Example 9.*—A sample of crude carbolate extracted from heating oil in a refinery process was used as the source of phenols in preparing a resin. The crude carbolate contained sufficient alkali to be equivalent to a 25% solution of sodium carbonate.

| | Parts |
|---|---|
| Crude carbolate from heating oil | 100 |
| Powdered rosin | 150 |
| 37% formalin | 200 |

The ingredients were mixed together and boiled for 30 minutes under reflux. The product was a dark brown solution which could be thinned with water to form slightly cloudy solutions which did not precipitate any resin, however. The reaction product contained 46.9% solids.

*Example 10.*—To illustrate the behavior of prior art resins in attempting to prepare aqueous solutions

| | Parts |
|---|---|
| m—p Cresols | 200 |
| 37.5% formalin | 263 |
| Concentrated hydrochloric acid | 2 | were heated under reflux until the exothermic reaction occurred, then boiled for 10 minutes more. The resin was washed thoroughly with water and dehydrated.

Equal parts of this resin and rosin were melted together and held at 280° C. for 3 hours. The product was a dark colored, brittle, friable, rosin-modified phenolic resin.

Ten parts of the rosin-modified phenolic resin were powdered and added to 100 parts of water containing 1 part sodium carbonate. The resin would not dissolve.

Ten parts of the rosin-modified phenolic resin were fused with 1 part anhydrous sodium carbonate, but the product would not dissolve in water even after 3 hours boiling.

It is evident that resins of the "Amberol" type have properties different from those of the present invention.

The following examples indicate the use of fatty acids along with rosin in the making of water-soluble resin compositions.

*Example 11*

| | Parts |
|---|---|
| Phenol | 50 |
| Tall oil | 25 |
| Rosin | 25 |
| Formalin | 100 |
| Sodium carbonate, dissolved in water | 3 |

All of the ingredients were mixed together at room temperature and boiled under reflux for 30 minutes. The clear brown solution obtained could be greatly diluted with water to form clear yellow solutions.

*Example 12*

| | Parts |
|---|---|
| Phenol | 50 |
| Formalin | 60 |
| Tung oil acids | 10 |
| Rosin | 20 |
| Sodium carbonate dissolved in water | 5 |

The ingredients were mixed in the order named and boiled under reflux for 30 minutes to form a clear brown solution which could be diluted without precipitation of the resin. A film of the product was poured on glass and baked at 150° C. for 1 hour. The coating was hard, red-brown in color and of slightly frosted appearance. It was not softened by water.

When stearic acid was used in place of the tung oil acids, a baked film was of a hard waxy nature.

The water-soluble phenolic resins made according to the above disclosures provide extremely stable aqueous solutions of heat-reactive phenol-aldehyde resins which are easily and cheaply made, require no hexamethylenetetramine to cause heat-hardening, can be diluted strongly with water without causing precipitation of resin, and which penetrate fibrous materials to bring about binding and water-resisting properties.

The abandoned application Serial No. 296,842, filed Sept. 27, 1939, contains subject matter common to the instant case.

What I claim is:

1. A water-soluble resinous composition capable of changing to an insoluble-infusible form by heat and suitable for use as a waterproofing size and binding agent for cellulosic materials, comprising the simultaneous reaction product of rosin, a phenol, aqueous formaldehyde, and sodium carbonate; the amount of phenol being from 65 to 33 per cent of the combined weight of rosin and phenol, the amount of formaldehyde being from 1 to 2 moles per mole of phenol, and the amount of anhydrous sodium carbonate being about 16 per cent of the weight of the rosin.

2. The process of reacting by heating together a mixture consisting of rosin, a phenol, aqueous formaldehyde, and sodium carbonate, whereby a water-soluble resinous composition is obtained which is capable of changing to an insoluble-infusible form by heat and suitable as a waterproofing size and binding agent for cellulosic materials; the amount of phenol being from 65 to 33 per cent of the combined weight of rosin and phenol, the amount of formaldehyde being from 1 to 2 moles per mole of phenol, and the amount of anhydrous sodium carbonate being about 16 per cent of the weight of the rosin.

HARRY BURRELL.